Oct. 11, 1932.    C. O. ROTHWEILER    1,882,523
COMBINATION LEVEL TRANSIT
Filed Nov. 17, 1927
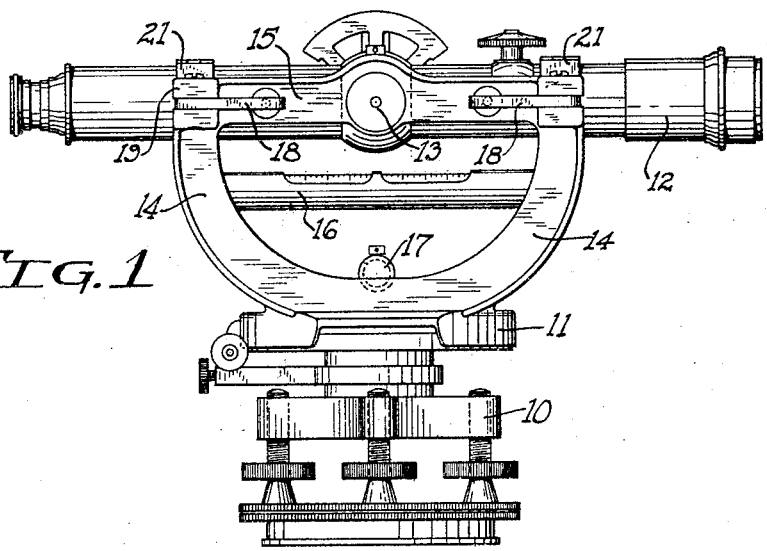
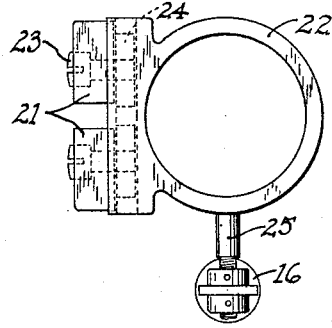
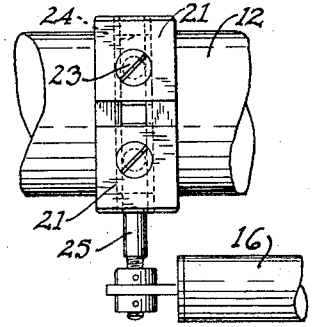
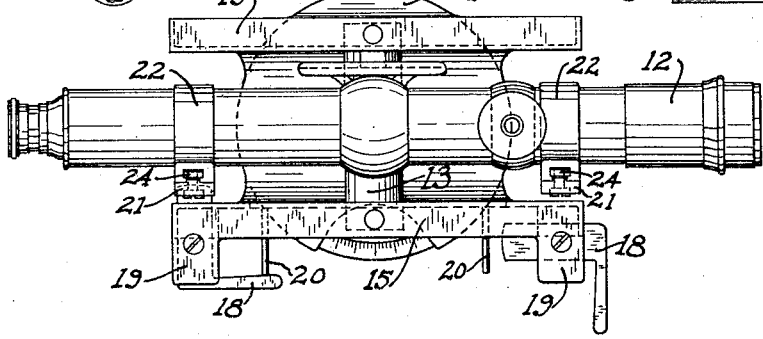

Patented Oct. 11, 1932

1,882,523

UNITED STATES PATENT OFFICE

CHARLES O. ROTHWEILER, OF MILWAUKEE, WISCONSIN, ASSIGNOR TO DAVID WHITE COMPANY, OF MILWAUKEE, WISCONSIN, A CORPORATION OF WISCONSIN

COMBINATION LEVEL TRANSIT

Application filed November 17, 1927. Serial No. 233,924.

This invention relates to surveying instruments commonly used by building contractors as levels and has for its object to provide for the use of the telescope thereof on a pivotal mounting whereby it may serve the purpose of a transit.

The invention constitutes an improvement on the details of construction of my co-pending application for convertible utility levels, Serial No. 756,517, filed December 17, 1924, which has resulted in Patent No. 1,655,627, dated January 10, 1928.

An object of the invention is to improve upon the construction of the standard by providing it with locking engagements with the telescope at two points widely spaced apart and on opposite sides of the pivotal mounting. Also by providing it with spaced arms extending directly to said locking points from the swivel mounting of the base, with a bridge connecting the arms for containing the pivotal mounting of the telescope, thereby affording free space between the arms for viewing the spirit level carried beneath the telescope as well as the plate level connecting the standards.

Another object of the invention is to improve upon the details of construction of the locking slots engaged by the locking levers whereby said slots may be adjusted in position with respect to the telescope and may be contracted to closely fit the locking levers engaged thereby.

With the above and other objects in view the invention consists in the combination level transit as herein claimed and all equivalents.

Referring to the accompanying drawing, in which like characters of reference indicate the same parts in different views, Fig. 1 is a side view of a combination level transit embodying the present invention;

Fig. 2 is a plan view thereof with one of the locking levers in its unlocking position;

Fig. 3 is a detail side view of one of the collar members, and

Fig. 4 is a front view thereof.

In this drawing, 10 indicates a leveling head provided with a spindle as usual, on which is mounted a standard base 11 having integral standards for supporting a telescope 12. These standards, instead of being vertical and extending directly to the pivotal telescope bearing 13 as usual, are formed in pairs on opposite sides of the instrument, standard members 14 of each pair extending upwardly and diverging from each other to provide an open space between them and being connected at their upper ends by horizontal bridge members 15, thus affording a wide open space where the usual standards occur and making it possible to mount the telescope level 16 on the bottom of the telescope, where it will be protected from injury and where it, as well as the transversely extending plate level 17, may be viewed from the side of the instrument when setting the instrument up.

Preferably, though not necessarily, the standard members 14 and bridge members 15 may be formed in an integral casting with the standard base 11 to form a strong and rigid support for the telescope.

As in my co-pending application referred to, means are provided for locking the telescope to the standards for use as a level, such lock serving to firmly hold the telescope normal to the spindle axis of the head but in the present instance the locking engagement is made both at the front and the rear of the telescope bearing 13 so that the telescope bearing is not relied on as fully as before for determining its position and these locking points are spaced as far apart as convenient to make the mounting of the telescope as rigid as possible.

The locking of the telescope in its position for use as a level is accomplished by means of locking levers 18, which may be L-shaped, as shown, and which are pivotally mounted in slots in lugs 19 projecting from the upper ends of the standard members 14, where they join with the bridge member 15. Said slots extend through the standard members so that the locking levers may swing from an open or unlocking position, as shown at the right of Fig. 2, to a closed or locking position, as shown at the left of Fig. 2, and in doing so engage in locking slots carried by the telescope, stop pins 20 being provided on the bridge member to limit their movement in this direction.

The locking slots engaged by the locking levers 18 are formed between pairs of adjustable blocks 21 slidably mounted in guideways formed in the vertical faces of collars 22 which are securely mounted on the telescope 12 as by sweating them in place. The guideways are undercut so that they form slots T-shaped in section and the blocks 21 have key projections fitting in the slots and clamping screws 23 set into the blocks are threaded in nut members 24 confined within the undercut walls of the slots, thereby permitting the blocks to be moved in the direction of the slot and then clamped in position. This permits the position of the slot to be adjusted with respect to the telescope and so in conjunction with the locking levers determines the position of the telescope for use as a level. This adjustment of the blocks furthermore permits them to be set farther apart or closer together so as to just fit the locking lever without play and thus further contribute to the accuracy of the positioning of the telescope for level purposes.

The collars 22 carry the screw studs 25 on which the telescope level 16 is mounted.

In the use of this instrument the operation of setting up is facilitated by the free and open exposure to view of the underslung telescope level and the plate level through the wide opening accorded by the spaced apart standard members, there being no obstruction beneath the telescope bearing to interfere and both levels are amply protected by the four standard members and their connecting bridge members. Furthermore, the locking of the telescope by two locking members, one at the front and the other at the rear of the telescope bearing, affords a rigid support that is able to withstand the rough treatment to which such instruments are subjected in the hands of building contractors and the like.

The adjustable slots for the locking levers facilitates the adjustment of the instrument to determine the position of the telescope for use as a level so that reliance may be made on the locking levers to quickly fix it in that position at any time and furthermore permits the width of said slots to be closely determined to fit the locking levers without unnecessary play and thereby secure greater accuracy besides compensating for any wear that may be occasioned by use.

What I claim as new and desire to secure by Letters Patent is:

1. A leveling instrument comprising a standard, a telescope pivotally mounted thereon to swing in a vertical plane, a collar secured to said telescope at a distance from its pivotal axis, a pair of blocks adjustably mounted on the collar to move transversely of the telescope to form a slot between them, and locking means on the standard for engaging said slot when the telescope is in predetermined position with respect to the standard.

2. A leveling instrument comprising a standard member, a telescope pivotally mounted thereon to swing in a vertical plane, a collar secured to said telescope at a distance from its pivotal axis and provided with a vertical undercut guideway, blocks slidably mounted in said guideway, screws passing through the blocks, nut members engaged by the screws and fitting in the undercut guideway, said blocks being adjustable in the guideway and forming a slot between them, and a locking member on the standard engaging the slot.

3. A leveling instrument comprising a base, upwardly extending standard members on the base arranged in pairs on each side of the instrument respectively with the standard members of each pair spaced apart and diverging, bridge members connecting the upper ends of the standard members of each pair, a telescope pivotally mounted on the bridge members, a telescope level mounted on the under side of the telescope and visible through the space between the standard members of each pair, collars secured to the telescope at a distance from its pivotal axis, adjustable blocks on the collars movable transversely of the telescope and forming slots between them, and locking levers mounted on the upper ends of the standard members on one side of the instrument and adapted to engage said slots for locking the telescope in position for use as a level when the telescope is in predetermined position with respect to the standard members.

In testimony whereof I affix my signature.

CHARLES O. ROTHWEILER.